(12) United States Patent
Ehrfeld et al.

(10) Patent No.: US 6,700,278 B1
(45) Date of Patent: Mar. 2, 2004

(54) DISK MOTOR WITH BEARING PRESTRESSING FEATURE

(75) Inventors: Wolfgang Ehrfeld, Mainz (DE); Hans-Dieter Stölting, Garbsen (DE); Frank Michel, Nieder-Olm (DE); Matthias Nienhaus, Mainz (DE); Stephan Kleen, Mainz (DE)

(73) Assignee: Institute fur Mikrotechnik Mainz GmbH, Mainz (DE)

( * ) Notice: Subject to any disclaimer, the term of this patent is extended or adjusted under 35 U.S.C. 154(b) by 0 days.

(21) Appl. No.: 09/889,500

(22) PCT Filed: Jan. 20, 2000

(86) PCT No.: PCT/EP00/00421
§ 371 (c)(1),
(2), (4) Date: Oct. 5, 2001

(87) PCT Pub. No.: WO00/44082
PCT Pub. Date: Jul. 27, 2000

(30) Foreign Application Priority Data

Jan. 22, 1999 (DE) .......................................... 199 02 371

(51) Int. Cl.[7] .............................................. H02K 29/00
(52) U.S. Cl. ....................... 310/190; 310/254; 310/268; 310/156.01
(58) Field of Search ................. 310/268, 683, 310/259, 156, 190

(56) References Cited

U.S. PATENT DOCUMENTS 4,164,690 A * 8/1979 Muller et al. ................ 318/254
4,922,162 A * 5/1990 Shiraki et al. ............... 310/268
6,172,442 B1 * 1/2001 Jun ............................. 310/268

FOREIGN PATENT DOCUMENTS

| DE | 2952095 | * | 7/1980 | .......... H02K/29/02 |
| DE | GM-75 419 11 | | 7/1980 | |
| DE | 34 25 805 | | 1/1986 | |
| DE | 35 28 303 | | 3/1986 | |
| DE | 29705634 | * | 7/1997 | .......... G11B/19/20 |
| JP | 62-015236 | * | 7/1987 | .......... H02K/29/00 |
| JP | 10-174406 | * | 6/1998 | .......... H02K/29/00 |

OTHER PUBLICATIONS

H.–D. Stolting, A. Beisse, *Elektrische Kleinmaschlnen*, Verlag Teubner, 1987, p. 169ff and p. 186ff.

* cited by examiner

*Primary Examiner*—Burton Mullins
(74) *Attorney, Agent, or Firm*—Hudak, Shunk & Farine, Co. LPA

(57) ABSTRACT

The invention relates to a disk motor with an armature disk, which is rotatably mounted and provided with permanent magnets, and with a stator which comprises a stator plate which is equipped with coils. The aim of the invention is to provide a disk motor that is as flat as possible and that is characterized by an improved smoothness of running. To this end, an annular soft-magnetic prestressing device is arranged concentrically on the stator plate in such a manner that at least one section of the prestressing device is located below the coil window of the coils in the axial direction. The armature disk may support an annular flux-return element opposite which the annular prestressing device is located in the radial direction. Said prestressing device has a cross-sectional contour that guides the magnetic lines of electric flux from the annular flux-return element to the coil window.

16 Claims, 12 Drawing Sheets

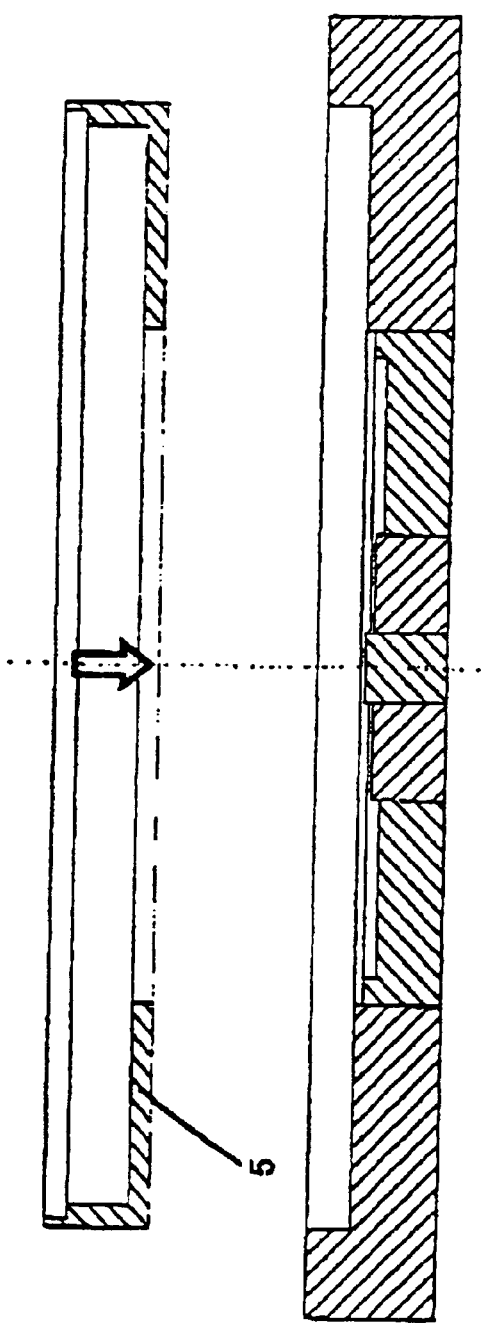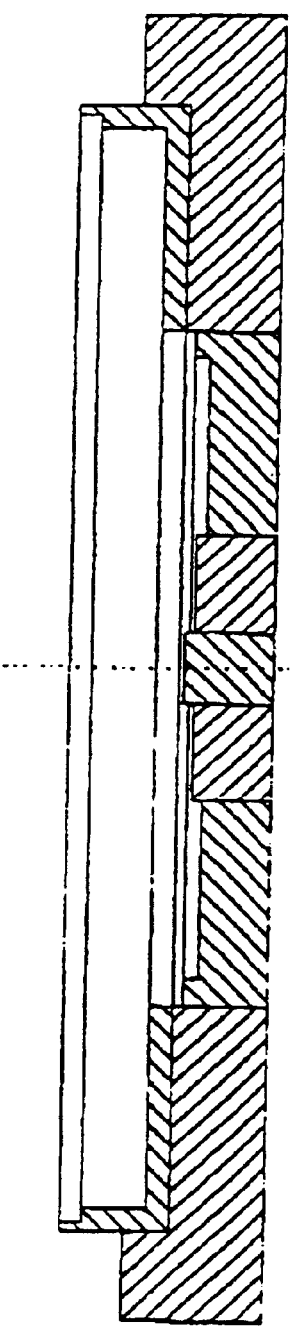
Fig. 5a
25
Fig. 5b

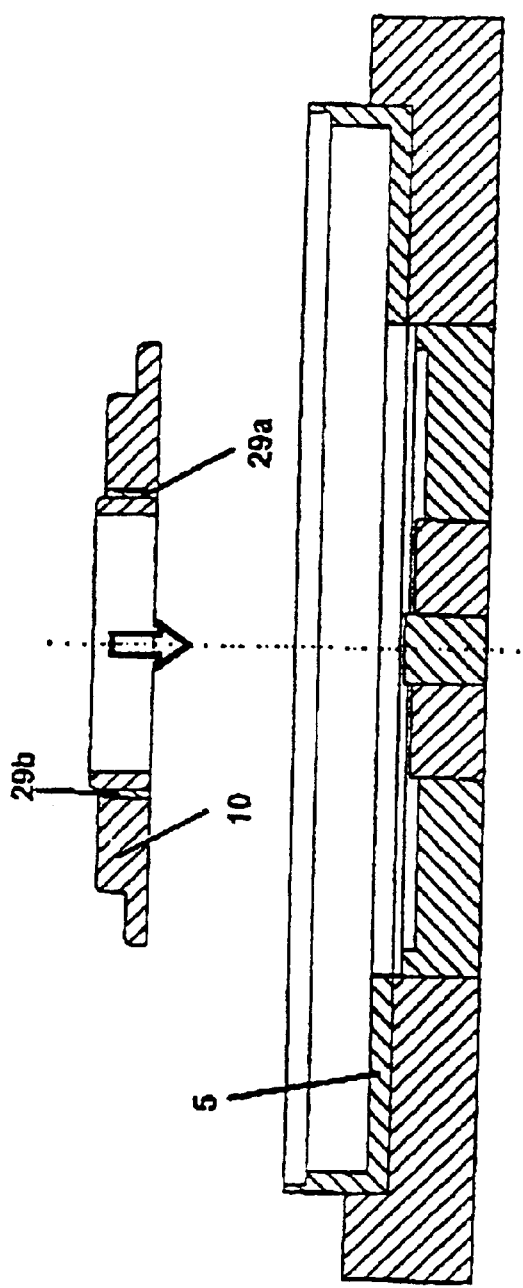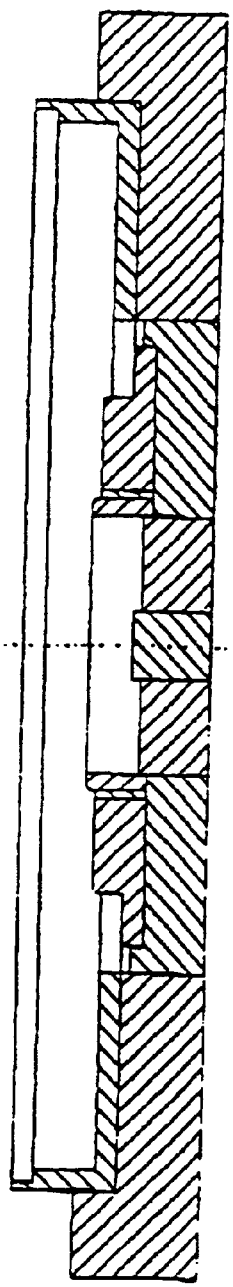
Fig. 6a
Fig. 6b

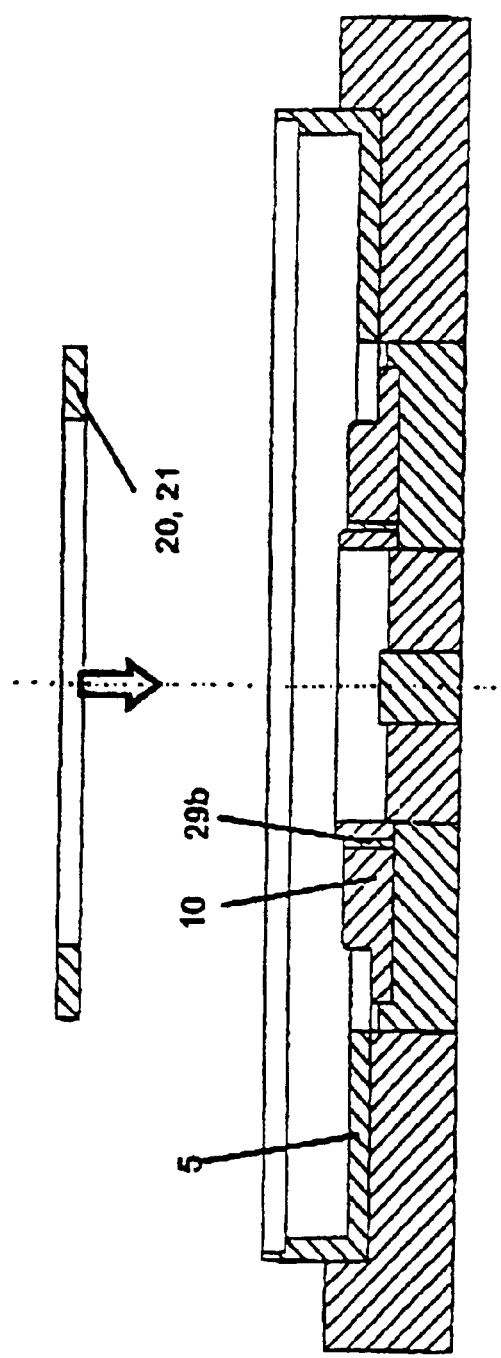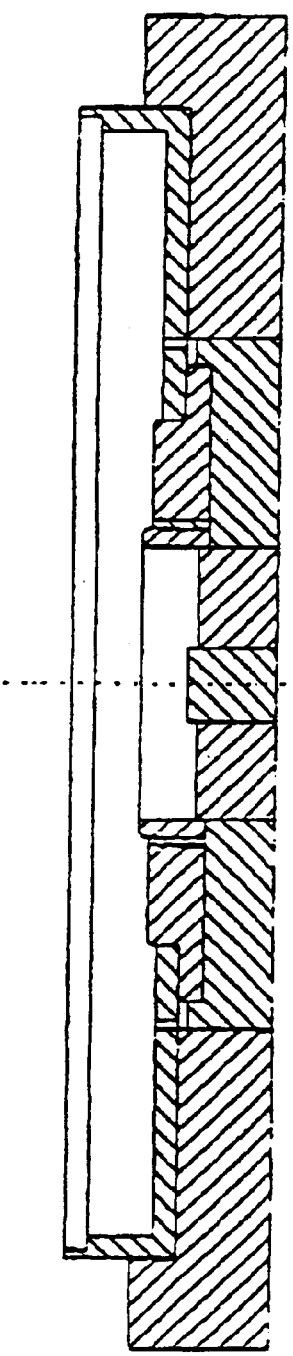
Fig. 7a
Fig. 7b

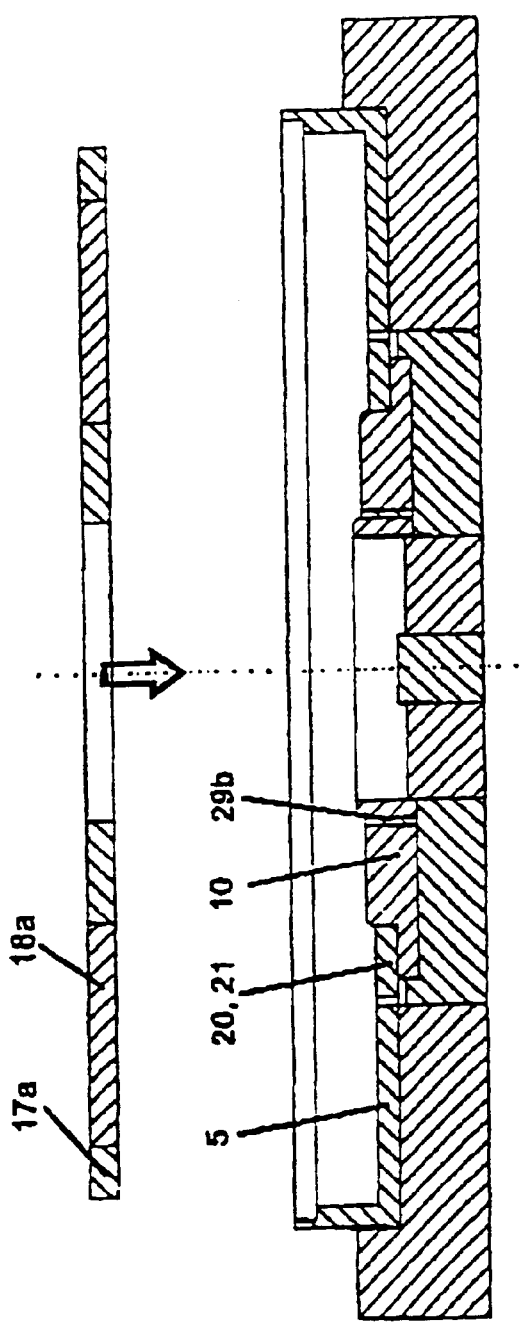
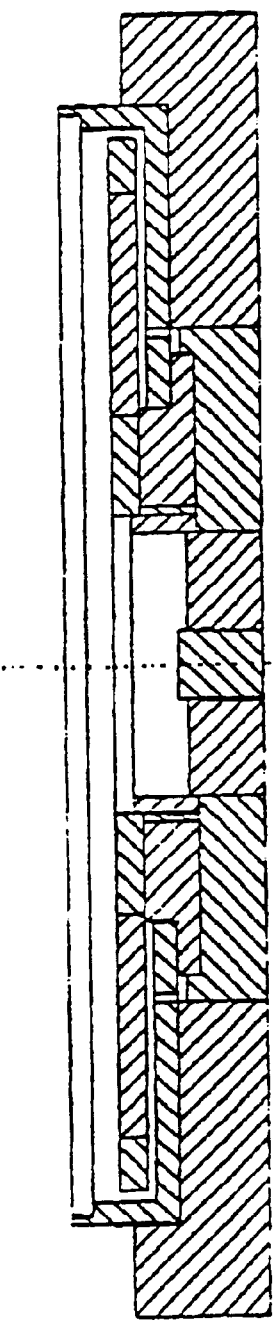
Fig. 8a
Fig. 8b

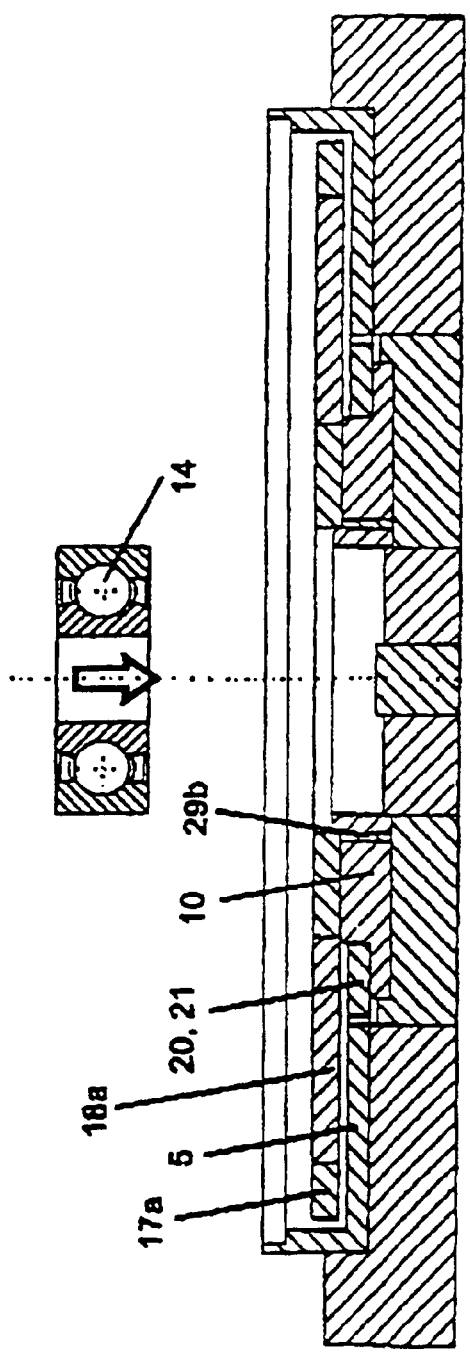
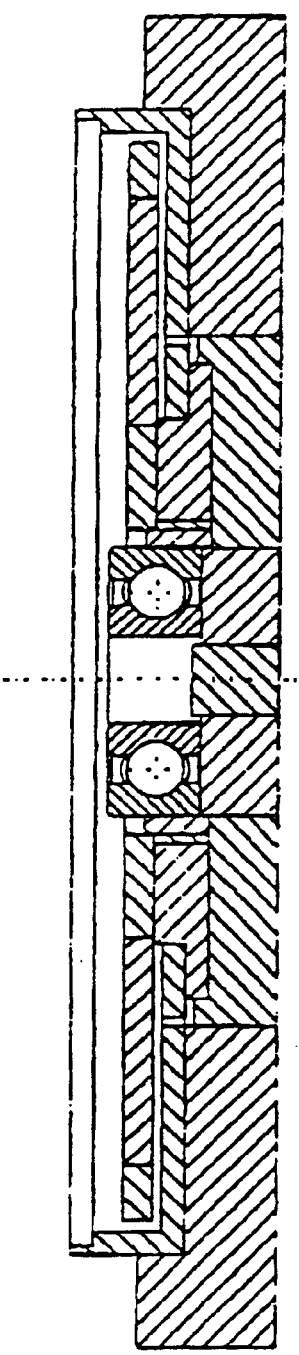
Fig. 9a
Fig. 9b

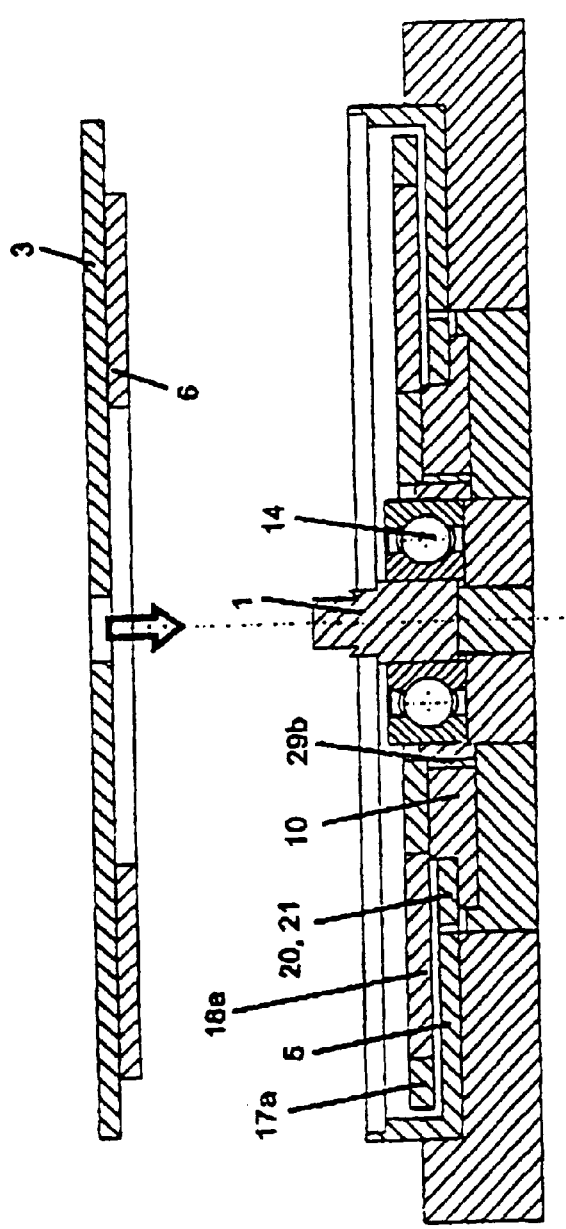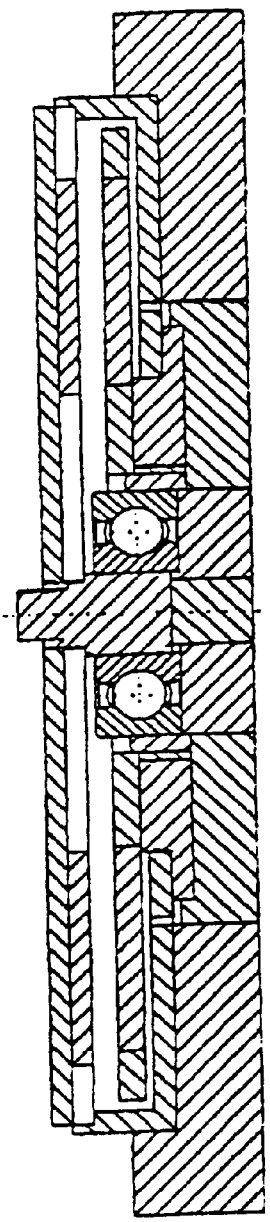
Fig. 11a
Fig. 11b

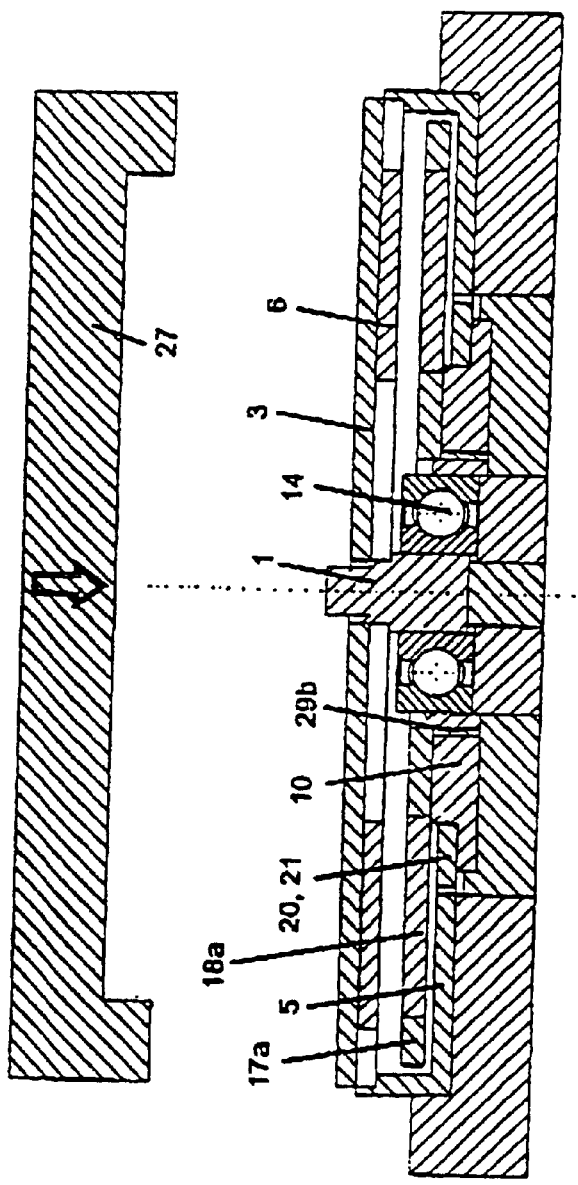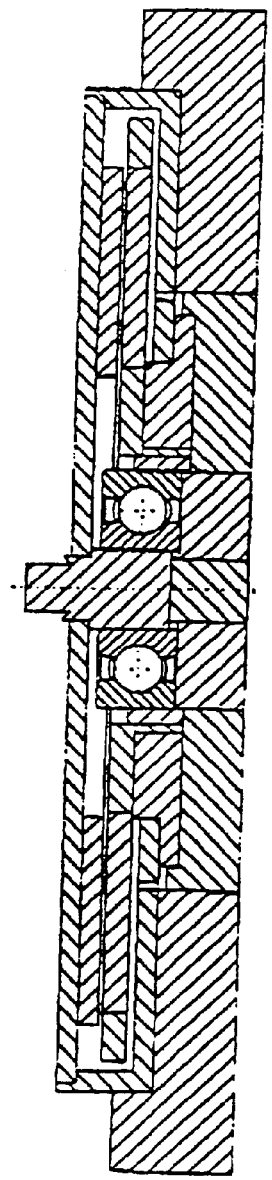
Fig. 12a
Fig. 12b

25

DISK MOTOR WITH BEARING PRESTRESSING FEATURE

DESCRIPTION

1. Field of the Invention

The invention relates to a disk motor with an armature disk (3), which is rotatably mounted and provided with permanent magnets, and with a stator comprising a stator plate which is equipped with coils.

2. Background of the Invention

Such disk motors are used as direct drives for turntables, for example. A basic explanation of disk motors can be found in H.-D. Stölting, A. Beisse, Elektrische Kleinmaschinen, Verlag Teubner, 1987, p. 169ff and p. 186ff.

DE 34 25 805 A1 discloses a DC motor realized as a disk motor to rotate a mirror. The stator comprises a coil-insulating frame and a stator flange connected thereto, which flange completely encloses the rotor and protects it from external influences. The rotor has a shaft which is attached to the mirror and which has on its lower end a magnet holder equipped with a two-pole permanent magnet. The rotor shaft ts punted in two ball bearings secured in the stator flange. To minimize axial play, the outer rings of the ball bearing must be prestressed against the associated inner rings. To achieve this, the citation teaches that the stator flange fixes both outer rings, which are arranged one above the other, whereas the associated inner rings are stressed in the opposite direction by the dimensions of the rotor. The disadvantage of this arrangement, however, is that there are two ball bearings arranged one above the other and separated by some distance. A single bearing is desirable to reduce the overall height.

To achieve high torques, disk motors are usually equipped with a soft-magnetic flux-return element, i.e. a closed magnetic circuit to increase the flux density in the air gap. The magnetic lines of electric flux are guided through ferromagnetic material with only small air gaps between the individual components. As explained in Stölting/Beisse, for example, this is realized by providing the circumference of the armature disk with an annular skirt, attached to which skirt is an annular flux-return element with which the flat coils of the stator are supported from underneath. The magnetic lines of electric flux run outward from the permanent magnets through the armature disk, down through the annular skirt and back to the permanent magnet through the annular flux-return element and the active region of the coil (cf. Stölting/Beisse, p. 186).

A disk motor of similar design is disclosed in German utility model DE-GM-75 419 11. The armature disk has at its center a bell-shaped spacer to which the annular flux-return element is fastened. The rotor housing is equipped with a bearing type in which two porous bearings and an intermediary felt ring for the storage of oil are arranged for the radial bearing of the rotor shaft. For axial bearing, the housing has a floor plate with a tube-like extension, on the lower edge of which is attached a supporting member for a thrust bearing for the rotor shaft. The bottom end face of the rotor shaft is crowned and rests on the thrust bearing. The overall height of this motor is significantly greater that that of the motor disclosed in DE 34 25 805 A1 because it has a total of three bearings.

Another variant of a disk motor with two ball bearings and a magnetic annular flux-return element is disclosed in DE 35 28 303 A1, which strives for a low overall height. The armature disk has a tube-like hub in which two ball bearings are arranged. The ball bearings are fixed at a defined distance to one another on a shaft stub attached to the stator plate. The function of the annular flux-return element is served by the stator plate, which must be manufactured of a suitable ferromagnetic material.

This disk motor has the following disadvantages: first there are two ball bearings with the associated additional assembly/installation costs; and second, the flux-return circuit does not run exclusively through the active region of the coils and thus does not contribute wholly to the generation of torque. Because the entire stator plate is involved in magnetic flux return, significant eddy currents are created which have a braking effect on the armature disk. Furthermore, attractive force is exerted on the armature disk in both the skirt region and the hub region, thus very large forces are exerted on the armature disk and in turn the bearings; significant bearing loads can result which under certain circumstances can lead to premature bearing failure. In addition, the entire bearing plate must be manufactured of ferromagnetic material and be of the same diameter as the armature disk. The motor is heavy as a result.

SUMMARY OF THE INVENTION

The object of the current invention is to provide a disk motor that is characterized by a flat design, good smoothness of running and high torque.

To achieve this object, the current invention teaches that an annular soft-magnetic prestressing device is arranged concentrically on the stator plate in such a manner that at least one section of the prestressing device is located below the coil window of the coils in the axial direction.

The advantage of the current invention lies in the fact that the magnetic prestressing eliminates the axial play of the armature disk bearing, so that an appropriate smoothness of running can also be achieved using only a single bearing, e.g. a ball bearing or a plain bearing. If a single bearing is sufficient, overall height is significantly reduced, yet there is still enough space for the bearing that commercially available ball bearings can be used.

If the disk motor is realized as a micromotor, commercially available bearings are understood to be those having an overall height of 1 mm or more. The advantage of commercially available bearings is that overall manufacturing costs are lower than if two custom bearings with extremely low overall heights must be used. The magnetic prestressing as taught by the current invention thus permits optimization of running characteristics with a lower overall height.

It has been demonstrated that providing the stator plate with a closed ring, or at least a ring segment, of a soft-magnetic, in particular a ferromagnetic, material is sufficient for the magnetic prestressing. The magnitude of the magnetic prestressing can be set via the width of the prestressing ring or ring segment with no change in the overall height, thus enabling adaptation to the geometry of the armature disk and the bearing used. This avoids unnecessarily large bearing loads, and thus can significantly extend the service life of the motor.

It is preferred that the radial width of the prestressing device be less than or equal to the corresponding width of the coil window.

By arranging at least one section of the prestressing device below the coil window of the coils in the axial direction, whereby the inner regions of the coil where the magnetic lines of electric flux run parallel to the coil axis are understood, the magnetic prestressing circuit also contributes to the generation of torque.

It is advantageous if the prestressing device includes a material with high ohmic resistance to prevent eddy currents.

Because the prestressing device is arranged on the stator plate, in particular on the top of the stator plate, there is no housing between the prestressing device and the coil window to adversely affect the magnetic field. The advantage of this is that the stator material can be freely chosen.

As taught by another embodiment, the armature disk can support an annular flux-return element which extends below the coils. In this case, the prestressing device is arranged as to be opposite the annular flux-return element in the radial direction. By locating the prestressing device below the coil window, the prestressing device becomes an element of the magnetic flux return and thus all of the magnetic lines of electric flux are used wholly for the generation of torque.

It is also advantageous that the prestressing device has a contour that guides the magnetic lines of electric flux from the annular flux-return element to the coil window.

The prestressing device preferably becomes wider in the direction of the coil window. A stepped cross-sectional contour, for example, is advantageous as it also permits a gearing with the stator plate.

A further advantage is that the material for the stator plate can be freely chosen because it does not have to be involved in magnetic flux return. Lightweight materials can therefore be used to reduce the weight of the motor.

The stator plate is preferably of a non-magnetic, preferably diamagnetic, material. This also applies to the armature disk bearing. This prevents the lines of electric flux from running over the bearing, which would adversely affect running smoothness. Here a non-magnetic material is understood as one that is neither a soft nor hard-magnetic material.

The stator plate must only be designed such that the prestressing ring can be securely held, for example. This also contributes to a compact design.

One embodiment of the current invention is described in greater detail below with reference to the attached drawings.

BRIEF DESCRIPTION OF THE DRAWINGS

FIG. 5a shows a vertical section before inserting the annular flux-return element into the mounting plate.

FIG. 5b shows a view, according to FIG. 5a after inserting the annular flux-return element into the mounting plate.

FIG. 6a shows a view according to FIGS. 5a, 5b before setting in the stator plate into the mounting plate.

FIG. 6b shows a view according to FIGS. 5a to 6a after setting in the stator plate into the mounting plate.

FIG. 7a shows a view according to FIGS. 5a to 6b before putting the prestressing ring on the stator plate.

FIG. 7b shows a view according to FIGS. 5a to 7a after putting the prestressing ring on the stator plate.

FIG. 8a shows a view according to FIGS. 5a to 7b before inserting the coil at the assembly of annular flux-return element, prestressing ring and stator plate.

FIG. 8b shows a view according to FIGS. 5a to 8a after inserting the coil at the assembly of annular flux-return element, prestressing ring and stator plate.

FIG. 9a shows a view according to FIGS. 5a to 8b before pressing in the ball bearing into the mounting plate and stator plate.

FIG. 9b shows a view according to FIGS. 5a to 9a after pressing in the ball bearing into the mounting plate and stator plate.

FIG. 11a shows a view according to FIGS. 5a to 10b before placing the assembly of armature disk and annular permanent magnet upon the shaft.

FIG. 11b shows a view according to FIGS. 5a to 11a after place the assembly of armature disk and annular permanent magnet upon the shaft.

FIG. 12a shows a view according to FIGS. 5a to 11b fore pushing the assembly of armature disk and annular permanent magnet into the final position.

FIG. 12b shows a view according to FIGS. 5a to 12a after pushing the assembly of armature disk and annular permanent magnet into the final position.

DETAILED DESCRIPTION OF THE INVENTION

Figure 1:
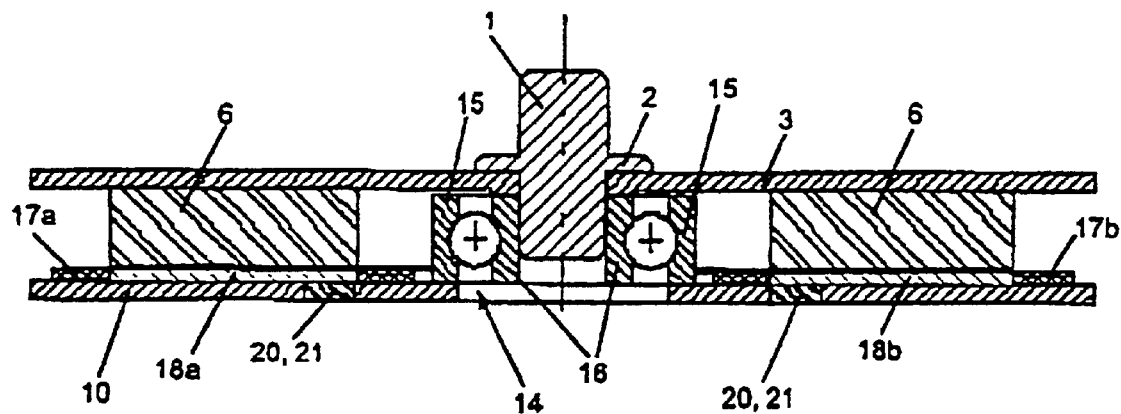
FIG. 1 shows a vertical section through a disk motor.

FIG. 1 shows a vertical section through a disk motor. The rotor comprises a shaft 1, which is inserted into an armature disk 3 and attached by its collar 2 to the armature disk 3. An annular permanent magnet 6 comprising permanent magnets with reversible polarity is located on the underside of the armature disk 3.

The stator comprises a stator plate 10 to which the outer ring 15 of a commercially available ball bearing 14 is fastened. The inner ring 16 of the ball bearing 14 rests against the shaft 1. Flat coils 17a and 17b are fastened to the top 12 of the stator plate 10, with the arrangement of the coils 17a and 17b such that the coil windows 18a,b formed by the interior space within the coil windings, are located below the annular permanent magnet 6. The flat coils 17a,b and the stator plate 10 can also be integrated into a monobody component.

A prestressing device 20 in the form of a prestressing ring 21 is inset into the stator plate 10. The arrangement of the prestressing ring 21 is chosen such that it extends below the coil windows 18a, 18b of the coils 17a, 17b in the axial, direction by some amount less than or equal to the size of the coil window. As a result of the prestressing ring 21/magnetic lines of electric flux contribute to the generation of torque.

The overall height of the disk motor is low and primarily defined by the height of the ball bearing 14.

Figure 2:
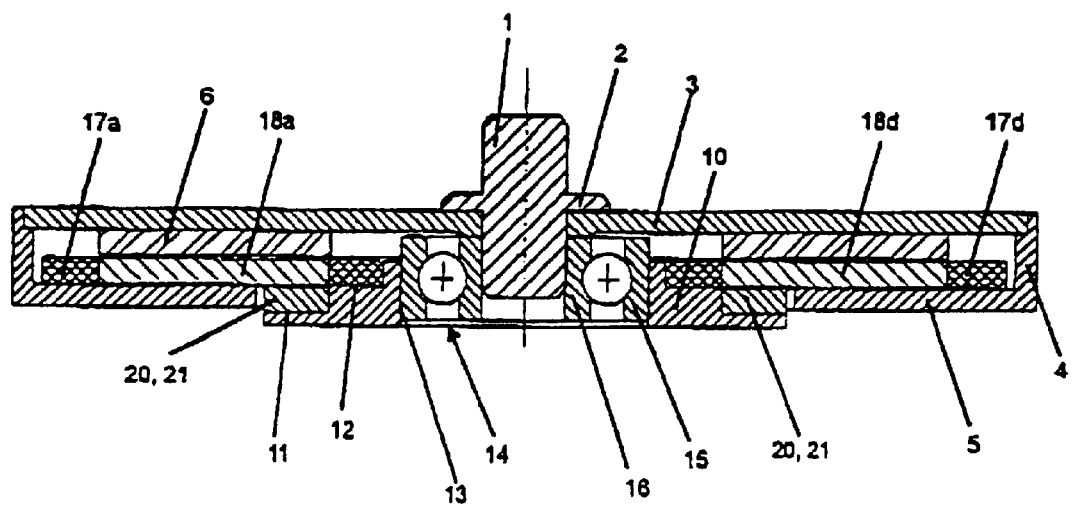
FIG. 2 shows a vertical section through a disk motor as realized in another embodiment.

FIG. 2 shows a disk motor with flux return. An annular skirt 4 extending downward and supporting an annular flux-return element 5 is fastened to the circumference of the armature disk 3. The stator plate 10 has a central bore 13 which seats the ball bearing 14, whereby the outer ring 15 is immovably held in the bore 13. Flat coils 17a and d, which extend into the space between the annular flux-return element 5 and the armature disk 3, are fastened to the top 12 of the stator plate 10. The coil arrangement shown in FIG. 2 with flat coils 17a and d and the associated coil windows 18a and d corresponds to a section along the line 11—11 through the coil arrangement shown schematically in FIG. 4. The stator plate 10 has at its outer edge an annular step 11 in which the prestressing ring of ferromagnetic material is fastened. The arrangement of the prestressing ring 21 is chosen such that it is opposite the annular flux-return element 5 in the radial direction. Because the stator plate 10 is not involved in magnetic flux return, the diameter of the stator plate 10 is only as large as the outside diameter of the prestressing ring. The material for the stator plate 10 can be chosen freely.

Figure 3:
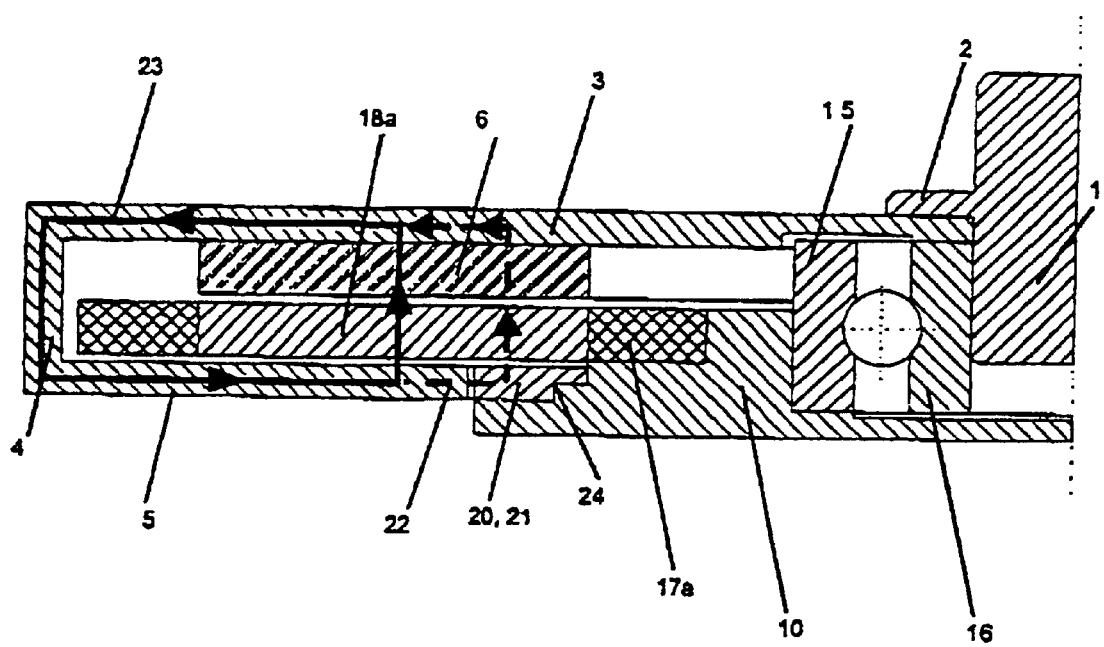
FIG. 3 shows an enlargement of the left portion of a sectional view of an embodiment modified from that shown in FIG. 2 to illustrate the magnetic circuits.

FIG. 3 shows an enlargement of a vertical section through an embodiment of a disk motor that has been modified from that shown in FIG. 2. The magnetic flux return is shown schematically as the closed circuit 23 ("main circuit") indicated by the arrows and the prestressing circuit 22 indicated by the broken line. The main circuit 23 runs through the armature disk 3, the annular skirt 4, the annular flux return element 5 and the coil window 18a of the coil 17a.

Because of the arrangement of the prestressing ring 21 as taught by the current invention, the magnetic lines of electric flux of the prestressing circuit 22 also run through the coil window 18a, so that this magnetic prestressing circuit 22 contributes to the generation of torque. Furthermore, because the prestressing circuit 22 is arranged as taught by the current invention as part of the magnetic flux return, the magnetic prestress can be set independent of the magnetic flux return and independent of the total torque of the disk motor by varying the width of the prestressing ring 21 in the coil window 18a. The cross-sectional contour of the prestressing ring 21 is designed to redirect the magnetic lines of electric flux to the coil window 18a, and therefore has a step 24. As a result, the prestressing ring 21 becomes wider in the direction of the coil window 18a, while at the same time forming a gearing for a better hold on the stator plate 10.

The magnetic prestressing causes the armature disk 3 to be attracted toward the stator plate 10, pulling the inner ring 16 of the ball bearing 14 downward. Because the outer ring 15 is immovably held in the stator plate 10, any axial play of the ball bearing 14 is eliminated.

EMBODIMENT

The embodiment relates to a design as shown schematically in FIGS. 2 and 3. The disk motor has an outside diameter of 12.8 mm and is 1.4 mm high.

The motor has a torque constant of 0.40 $\mu$Nm/Ma. The motor can easily be used for rotational speeds of up to 20,000 rpm while exhibiting good running characteristics.

Due to the design, the ball bearing is not influenced by the magnetic field. An attractive force in the Mn range is exerted by the magnetic prestressing.

The annular permanent magnet is manufactured by means of micro injection molding or sizing of an NdFeB powder containing a plastic as binder. The annular magnet is approximately 300 $\mu$m thick. The annular magnet is axially magnetized such that it has eight poles (four pole pairs) on the end face.

Miniaturized flat coils are manufactured by means of UV-deep lithography and subsequent galvanic precipitation.

The flat coils comprise two superimposed printed conductors separated by a polyimide film as a carrier. There are six coils, with the opposing coil pairs connected in series.

The flat coils are approximately 250 $\mu$m high.

Alternatively, the coils can be manufactured as multi-layer printed circuit boards (PCB) using micro precision laser technology.

The air gap between the coils and the rotating motor components is only approximately 80° $\mu$m.

Control is by means of a three-phase rectangular pulse signal, which in another embodiment is generated by a digital control unit integrated into a board bearing the disk motor.

FeSi is used as the soft-magnetic material for individual components such as the armature disk and annular flux-return element. Inexpensive mass production, such as by means of stamping and deep drawing, is made possible by the design of the components. The individual components are assembled together on an assembly platform, whereby only linear movements are made in only one assembly direction.

Figure 4:
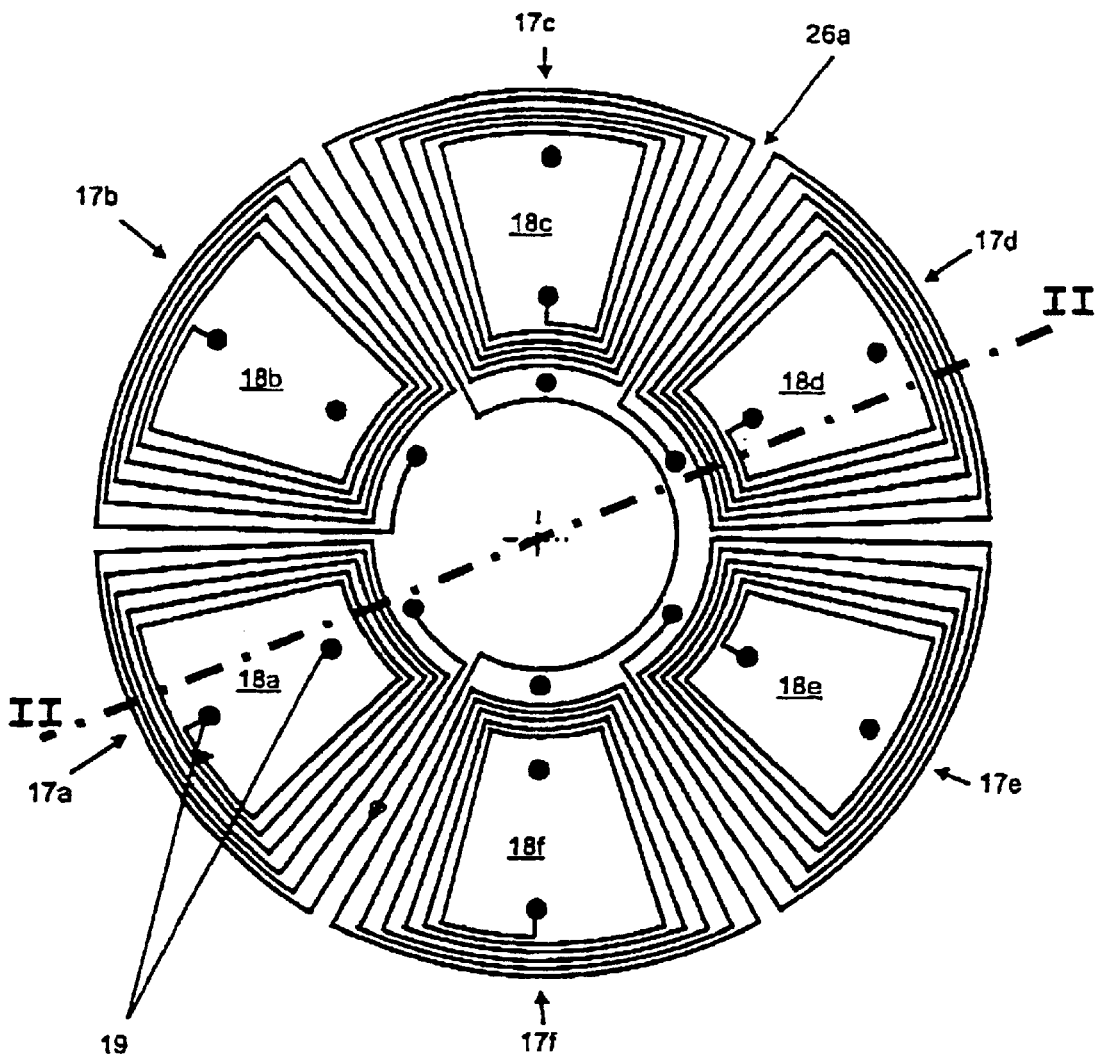
FIG. 4 shows a top view of the coil arrangement shown schematically.
Figure 10A:
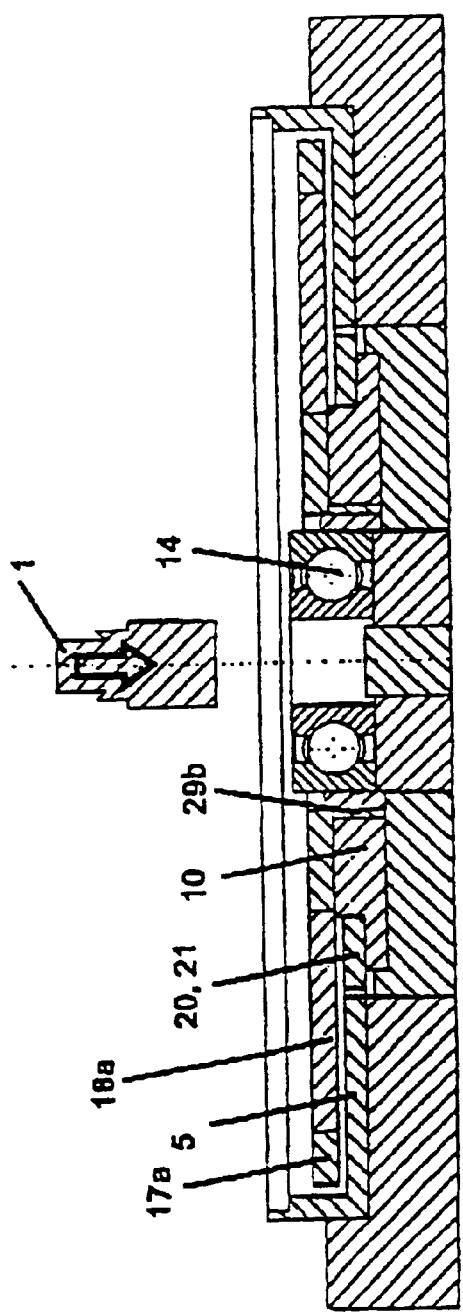
FIG. 10a shows a view according to FIGS. 5a to 9b before Dushing in the shaft into the ball bearing.
Figure 10B:
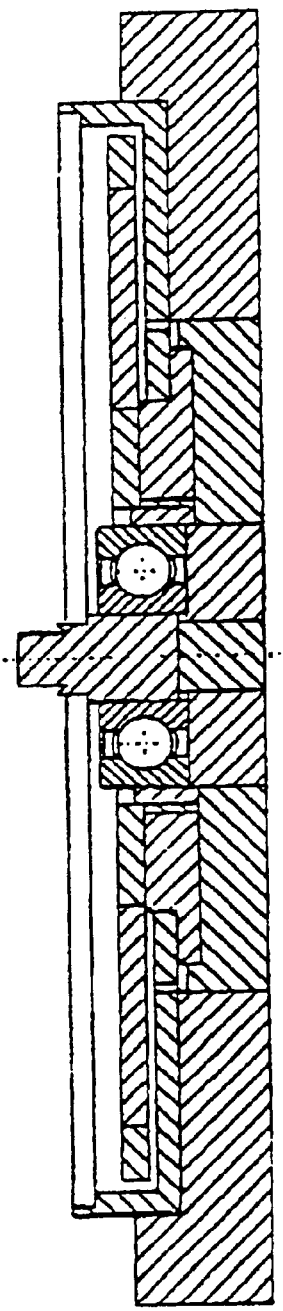
FIG. 10b shows a view according to FIGS. 5a to 10a after pushing in the shaft into the ball bearing

FIG. 4 shows the design of the flat coils 17a–f. The coils 17a–f comprise superimposed films 26 with printed conductors, whereby the printed conductors of the individual films are connected to one another by the contact points 19, of which only two are identified. Radially opposed coils are connected in series to achieve a three-phase motor configuration.

FIGS. 5–13 show one assembly option for the disk motor shown in FIG. 2, whereby the "a" figure shows the condition before and the "b" figure shows the condition after installing an additional component.

Assembly requires a mounting plate into which the individual components are inserted. FIG. 5a shows the annular flux-return element 5 being inserted into the mounting plate 25. This is followed by the stator plate 10 (FIGS. 6a and b) and the setting of the prestressing ring 21 in the stator plate 10 (FIGS. 7a,b). In the next step (FIGS. 8a and b), the coils 17a–f are installed. The coils 17a–f are then mechanically and electrically connected to the contact pins 29a,b in the stator plate 10, which pins 29a,b lead to the outside.

The ball bearing 14 is then friction set (FIGS. 9a and 9b). In a further step, the shaft 1 is installed (FIGS. 10a and 10b) and the armature disk 3 with the annular permanent magnet 6 is placed on the shaft (FIGS. 11a and b).

Figure 13A:
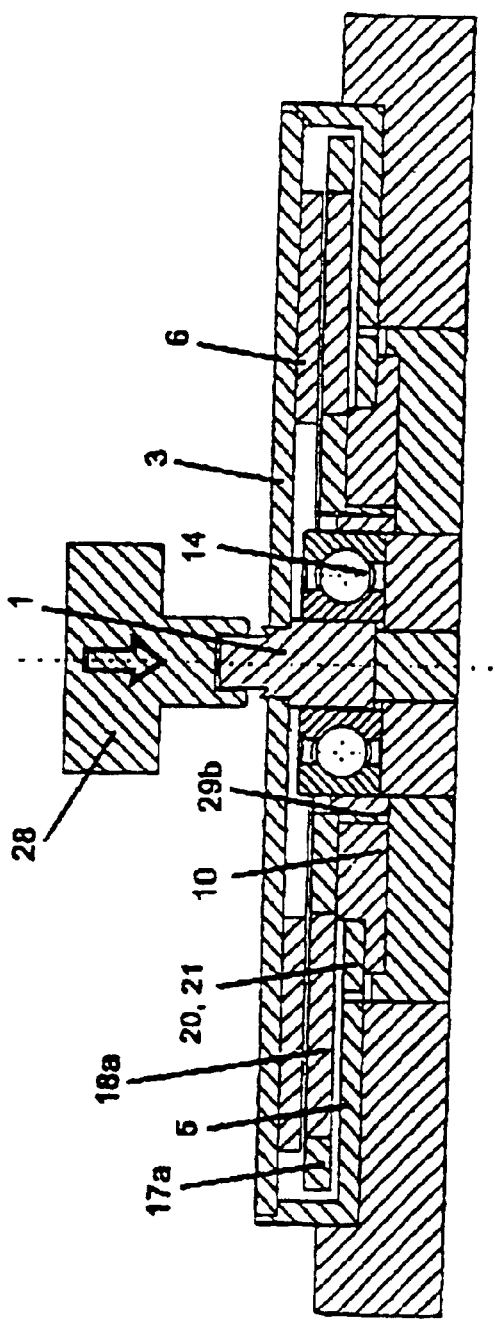
FIG. 13a shows a view according to FIGS. 5a to 12b before the riveted joining of the armature disk.
Figure 13B:
FIG. 13b shows a view according to FIGS. 5a to 13a after the riveting joining of the armature disk.
Figure 13B:
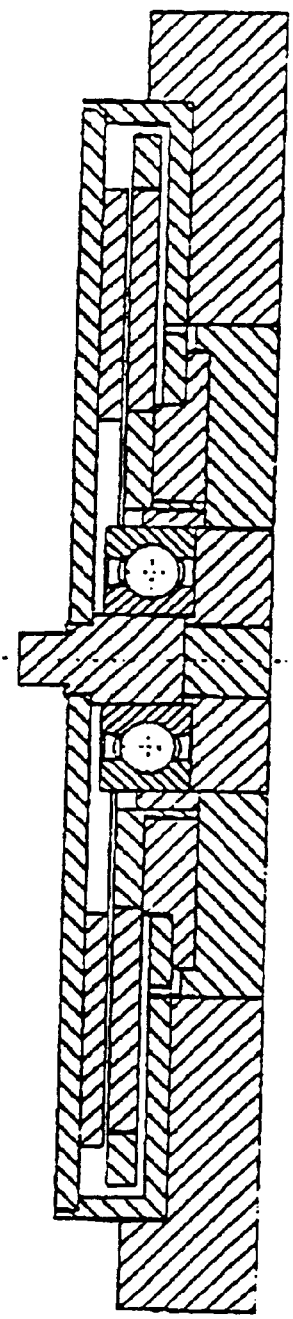

FIGS. 12a and 12b show the friction setting of the armature disk 3 using a force die 27. The last step is the riveting of the armature disk using a riveting die 28 (FIGS. 13a and 13b).

REFERENCE NUMBERS

1 Shaft
2 Collar
3 Armature disk
4 Annular skirt
5 Annular flux-return element
6 Annular permanent magnet
10 Stator plate
11 Annular step
12 Top
13 Central bore
14 Ball bearing
15 Outer ring
16 Inner ring
17a–f Coil
18a–f Coil window
19 Contact point
20 Prestressing device 21 Prestressing ring
22 Magnetic prestressing circuit
23 Magnetic main circuit
24 Step
25 Mounting plate
26 Film
27 Force die
28 Riveting die
29a,b Contact pin

What is claimed is:

1. A disk motor comprising:
   an armature disk, which is rotatably mounted and provided with permanent magnets, and with a stator comprising a stator plate which is equipped with coils, wherein an annular soft-magnetic prestressing device is arranged concentrically on the stator plate in such a manner that at least one section of the prestressing device is located below the coil window of the coils in the axial direction, and wherein the prestressing device has a radial width which is less than or equal to the radial width of the coil window.

2. A disk motor as claimed in claim 1, wherein the stator plate is of a non-magnetic material.

3. A disk motor as claimed in claim 2 wherein the annular prestressing device comprises a prestressing ring.

4. A disk motor as claimed in claim 2, wherein the annular prestressing device comprises at least one ring segment.

5. A disk motor as claimed in claim 1, wherein the annular prestressing device comprises a prestressing ring.

6. A disk motor as claimed in claim 5, wherein the armature disk supports an annular flux-return element located radially opposite the annular prestressing device.

7. A disk motor as claimed in claim 1, wherein the annular prestressing device comprises at least one ring segment.

8. A disk motor as claimed in claim 7, wherein the armature disk supports an annular flux-return element located radially opposite the annular prestressing device.

9. A disk motor as claimed in claim 8, wherein the prestressing device has a cross-sectional contour that guides the magnetic lines of electric flux from the annular flux-return element to the coil window.

10. A disk motor as claimed in claim 9, wherein the cross-section of the prestressing device becomes wider in the direction of the coil window.

11. A disk motor as claimed in claim 9, wherein the prestressing device has a stepped cross-sectional contour.

12. A disk motor as claimed in claim 10, wherein the prestressing device has a stepped cross-sectional contour.

13. A disk motor as claimed in claim 1, wherein the armature disk supports an annular flux-return element located radially opposite the annular prestressing device.

14. A disk motor as claimed in claim 13, wherein the prestressing device has a cross-sectional contour that guides the magnetic lines of electric flux from the annular flux-return element to the coil window.

15. A disk motor as claimed in claim 14, wherein the cross-section of the prestressing device becomes wider in the direction of the coil window.

16. A disk motor as claimed in claim 14, wherein the prestressing device has a stepped cross-sectional contour.

* * * * *

UNITED STATES PATENT AND TRADEMARK OFFICE
CERTIFICATE OF CORRECTION

PATENT NO. : 6,700,278 B1 Page 1 of 1
APPLICATION NO. : 09/889500
DATED : March 2, 2004
INVENTOR(S) : Wolfgang Ehrfeld et al.

It is certified that error appears in the above-identified patent and that said Letters Patent is hereby corrected as shown below:

On the Title page under "Inventors", please replace Frank Michel's city of residence "Nieder-Olm (DE)" with --Mainz (DE)--.

Signed and Sealed this

Eighth Day of January, 2008

JON W. DUDAS
*Director of the United States Patent and Trademark Office*